(12) United States Patent
Lee (10) Patent No.: US 12,313,841 B2
(45) Date of Patent: May 27, 2025

(54) PRISM DRIVE DEVICE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 538 days.

(21) Appl. No.: 17/754,417

(22) PCT Filed: Oct. 8, 2020

(86) PCT No.: PCT/KR2020/013810
§ 371 (c)(1),
(2) Date: Mar. 31, 2022

(87) PCT Pub. No.: WO2021/075798
PCT Pub. Date: Apr. 22, 2021

(65) Prior Publication Data
US 2022/0326510 A1 Oct. 13, 2022

(30) Foreign Application Priority Data

Oct. 15, 2019 (KR) .......................... 10-2019-0128081

(51) Int. Cl.
*G02B 26/08* (2006.01)
*G02B 5/04* (2006.01)
*G02B 7/18* (2021.01)

(52) U.S. Cl.
CPC ......... *G02B 26/0883* (2013.01); *G02B 5/045* (2013.01); *G02B 7/1805* (2013.01)

(58) Field of Classification Search
CPC ..... G02B 5/04; G02B 7/1805; G02B 26/0883

USPC .................................................. 359/834, 833
See application file for complete search history.

(56) References Cited

U.S. PATENT DOCUMENTS

| 4,726,640 | A | 2/1988 | Iwama et al. |
| 11,029,374 | B2 * | 6/2021 | Park .................... G01R 33/072 |
| 11,627,253 | B2 * | 4/2023 | Jeong ..................... H04N 23/54 |
| | | | 348/208.8 |
| 11,991,431 | B2 * | 5/2024 | Roh ........................ H04N 23/60 |

(Continued)

FOREIGN PATENT DOCUMENTS

| JP | 2003-302585 A | 10/2003 |
| JP | 2014-224983 A | 12/2014 |

(Continued)

OTHER PUBLICATIONS

Supplementary European Search Report dated Nov. 18, 2022 in European Application No. 20877216.0.

(Continued)

*Primary Examiner* — Ricky D Shafer
(74) *Attorney, Agent, or Firm* — Saliwanchik, Lloyd & Eisenschenk (57) ABSTRACT

A prism drive device of the present invention comprises: a housing; a mover disposed in the housing; a prism disposed in the mover; a first magnet disposed in the mover; a coil disposed in the housing; a guide part disposed between the housing and the mover and configured to guide the tilting of the mover; and a second magnet disposed in the housing and facing the first magnet, wherein the first magnet and the second magnet face each other with the same pole.

18 Claims, 12 Drawing Sheets

(56) References Cited

U.S. PATENT DOCUMENTS

| | | | |
|---|---|---|---|
| 12,003,835 B2* | 6/2024 | Jang | H04N 23/51 |
| 12,035,024 B2* | 7/2024 | Bang | H04N 23/57 |
| 2001/0021165 A1 | 9/2001 | Nakagishi | |
| 2012/0026611 A1 | 2/2012 | Hu et al. | |
| 2017/0115463 A1 | 4/2017 | Osaka et al. | |
| 2018/0239161 A1* | 8/2018 | Seol | G02B 27/646 |
| 2018/0364450 A1* | 12/2018 | Lee | H04N 23/55 |
| 2019/0049687 A1* | 2/2019 | Bachar | G02B 27/646 |
| 2019/0129197 A1* | 5/2019 | Kim | G02B 27/646 |
| 2019/0228562 A1 | 7/2019 | Song | |
| 2020/0363626 A1* | 11/2020 | Seo | G03B 30/00 |
| 2021/0136261 A1* | 5/2021 | Lee | G03B 30/00 |
| 2021/0397017 A1* | 12/2021 | Jeong | G03B 5/00 |
| 2022/0269146 A1* | 8/2022 | Lee | G03B 17/17 |

FOREIGN PATENT DOCUMENTS

| | | |
|---|---|---|
| JP | 2016-85347 A | 5/2016 |
| JP | 2017-83783 A | 5/2017 |
| KR | 10-2011-0041246 A | 4/2011 |
| KR | 10-2016-0094636 A | 8/2016 |
| KR | 10-2018-0004423 A | 1/2018 |
| KR | 10-2018-0120894 A | 11/2018 |
| KR | 10-2004802 B1 | 7/2019 |

OTHER PUBLICATIONS

International Search Report dated Jan. 20, 2021 in International Application No. PCT/KR2020/013810.
Office Action dated May 24, 2023 in Chinese Application No. 202080072258.6.

* cited by examiner

PRISM DRIVE DEVICE

CROSS-REFERENCE TO RELATED APPLICATIONS

This application is the U.S. national stage application of International Patent Application No. PCT/KR2020/013810, filed Oct. 8, 2020, which claims the benefit under 35 U.S.C. § 119 of Korean Application No. 10-2019-0128081, filed Oct. 15, 2019, the disclosures of each of which are incorporated herein by reference in their entirety.

TECHNICAL FIELD

The present invention relates to a prism driving device.

BACKGROUND ART

The camera module photographs a subject and stores it as an image or video, and is installed in mobile terminals such as cell phones, laptops, drones, and vehicles.

Meanwhile, portable devices such as smartphones, tablet PCs, and laptops have built-in micro camera modules, and these camera modules automatically adjust the distance between the image sensor and the lens, thereby performing autofocus (AF) function that aligns the focal length of the lens.

In addition, recent camera modules may perform zooming function of zooming up or zooming out which enables photographing of distant subjects with increased or decreased magnification through a zoom lens.

In addition, recent camera modules employ image stabilization (IS) technology to correct or inhibit image shaking due to camera movement caused by unstable fixing devices or user movement.

Meanwhile, a camera module being applied to a mobile terminal such as a mobile phone recently uses a prism to reduce the size of a product while implementing a zooming function.

DETAILED DESCRIPTION OF THE INVENTION

Technical Subject

An object to be solved by the present invention is to provide a prism driving device that can reduce the size of a product.

Technical Solution

A prism driving device according to an aspect of the present invention for achieving the above object comprises: a housing; a mover disposed in the housing; a prism disposed in the mover; a first magnet disposed in the mover; a coil disposed in the housing; a guide part disposed between the housing and the mover and configured to guide the tilting of the mover; and a second magnet disposed in the housing and facing the first magnet, wherein the first magnet and the second magnet face each other with the same pole.

In addition, the mover may be supported by the guide part by the repulsive force of the first magnet and the second magnet.

In addition, the central region of the guide part and the first magnet may not be overlapped in an optical axis direction.

In addition, the first magnet may comprise first to third magnet units, and the coil may comprise first to third coils.

In addition, the first magnet unit is disposed on a first side surface of the mover, the second magnet unit is disposed on a second side surface facing the first side surface of the mover, and the third magnet unit may be disposed on a lower surface of the mover.

In addition, the first coil is disposed at a position corresponding to the first magnet unit, the second coil is disposed at a position corresponding to the second magnet unit, and the third coil may be disposed at a position corresponding to the third magnet unit.

In addition, the first and second magnet units allow the mover to be tilted with respect to a first axis, and the third magnet unit may allow the mover to be tilted with respect to a second axis perpendicular to the first axis.

In addition, a normal line of the first side surface may be parallel to the normal line of the second side surface, and the normal line of the first side surface or the second side surface may be orthogonal to the normal line of the lower surface.

In addition, the second magnet may comprise a fourth magnet unit disposed at a position corresponding to the first magnet unit, and a fifth magnet unit disposed at a position corresponding to the second magnet unit.

In addition, the length of the fourth and fifth magnet units in a first direction is longer than the length of the first and second magnet units in a first direction, respectively; and the length of the fourth and fifth magnet units in a second direction perpendicular to the first direction may be shorter than lengths of the first and second magnet units in the second direction, respectively.

In addition, the fourth and fifth magnet units may be disposed higher than central regions of the first and second magnet units, respectively.

In addition, the housing comprises a first groove being formed on an upper surface, and the second magnet may be disposed in the first groove.

In addition, the second magnet may be disposed on one side of the first magnet, and the guide part may be disposed on the other side of the first magnet.

In addition, the guide part may be disposed between the surfaces facing each other of the mover and the housing.

In addition, the guide part may comprise a first protruding portion disposed on a first surface facing the mover and a second protruding portion disposed on a second surface facing the housing.

In addition, the first protruding portion comprises a first protruding unit disposed on one side with respect to the center of the first surface, and a second protruding unit disposed on the other side, wherein the second protruding portion may comprise a third protruding unit disposed at one side with respect to the center of the second surface and a fourth protruding unit disposed at the other side.

In addition, the mover is formed on the outer side surface of the mover facing the first surface and comprises a first recess corresponding to the first protruding portion, wherein the housing is formed on an inner side surface of the housing facing the second surface, and wherein a second recess corresponding to the second protruding portion.

In addition, a substrate being disposed in the housing may be comprised, wherein the coil may be electrically connected to the substrate.

In addition, it may comprise a yoke being disposed between the mover and the first magnet.

A prism driving device according to an aspect of the present invention for achieving the above object comprises: a housing; a mover disposed in the housing; a prism disposed in the mover; a first magnet disposed in the mover; a coil disposed in the housing; a guide part disposed between the housing and the mover to guide tilting of the mover; and a second magnet disposed in the housing and facing the first magnet, wherein the mover and the guide part are supported by the housing by a repulsive force between the first magnet and the second magnet.

Advantageous Effects

Through the present embodiment, it is possible to provide a prism driving device capable of reducing the size of a product.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, the present invention will be described in more detail with reference to the accompanying drawings.

Figure 1:
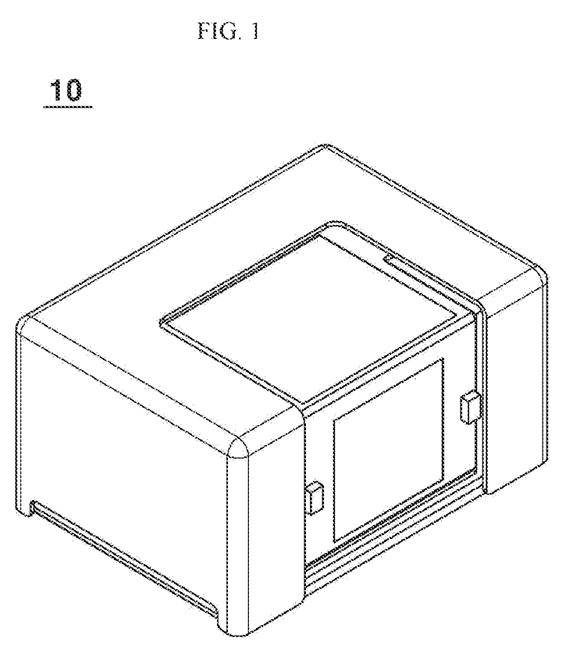
FIG. 1 is a perspective view of a prism driving device according to an embodiment of the present invention.
Figure 2:
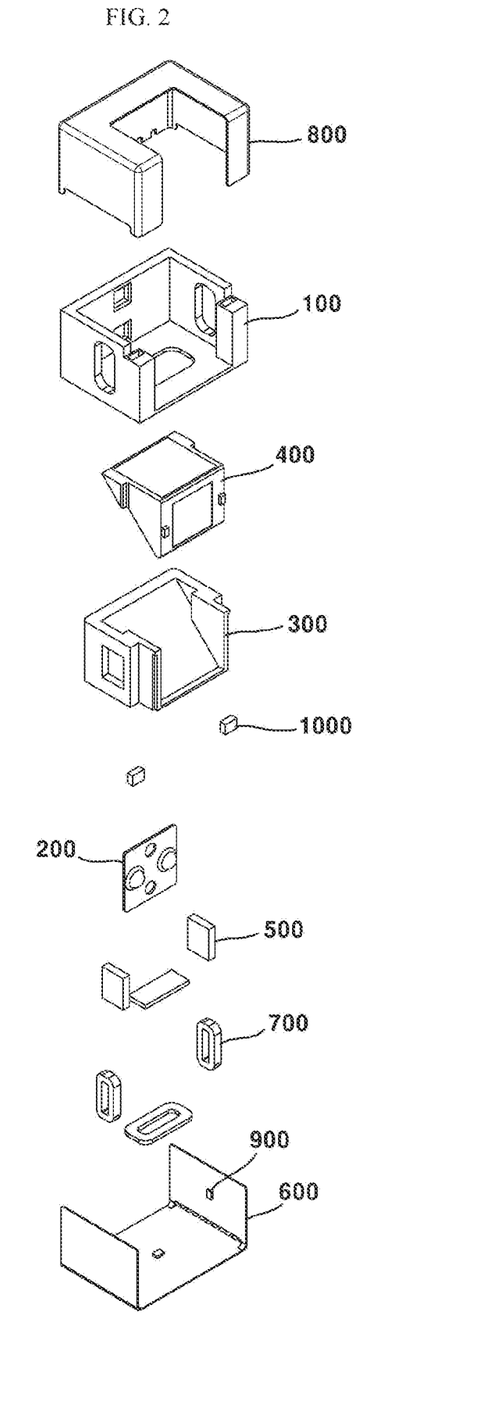
FIG. 2 is an exploded perspective view of a prism driving device according to an embodiment of the present invention.
Figure 3:
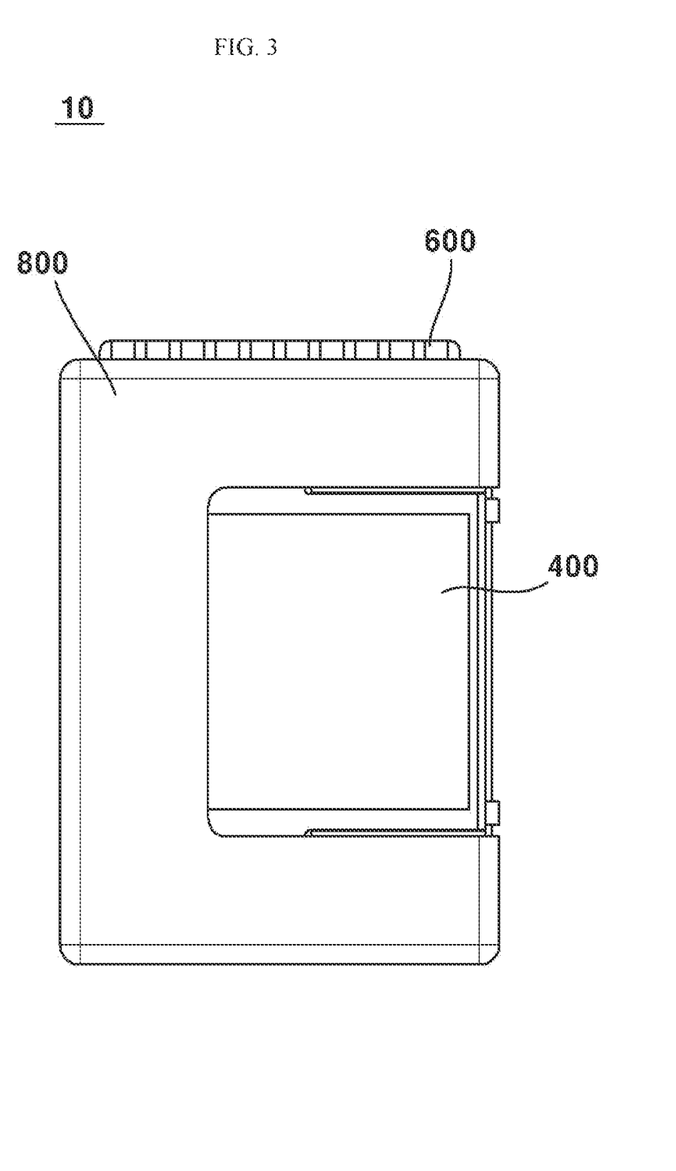
FIG. 3 is a plan view of a prism driving device according to an embodiment of the present invention.
Figure 4:
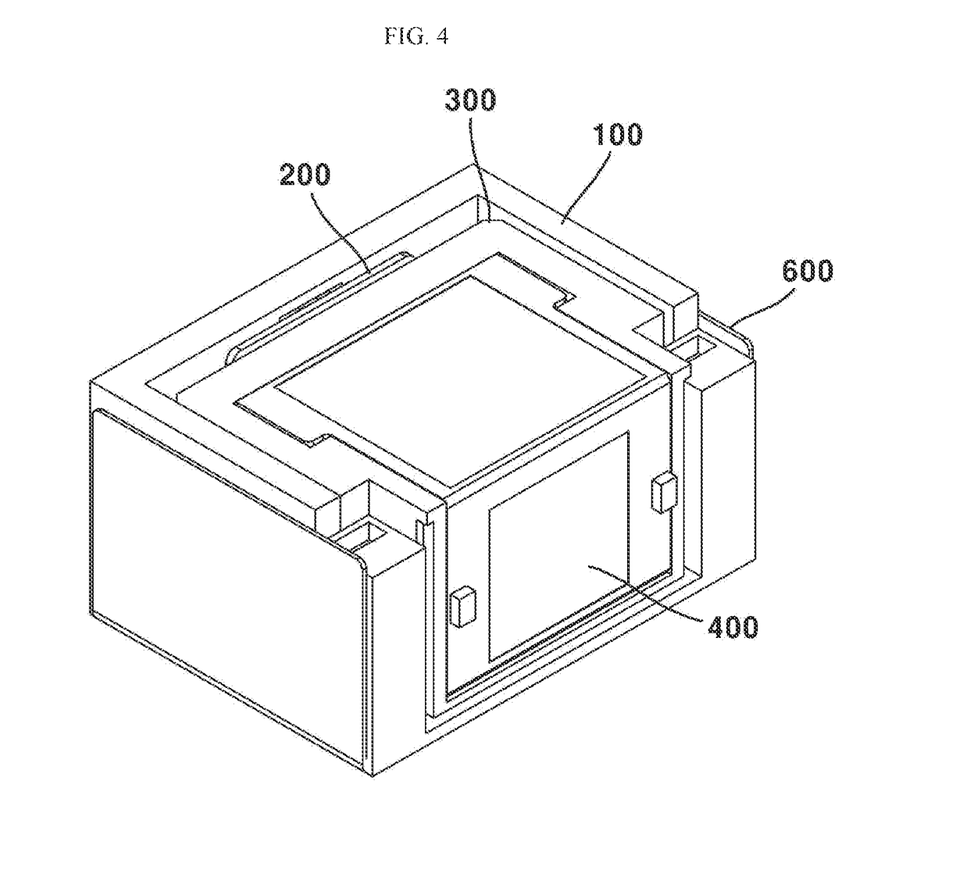
FIG. 4 is a perspective view of a partial configuration of a prism driving device according to an embodiment of the present invention.
Figure 5:
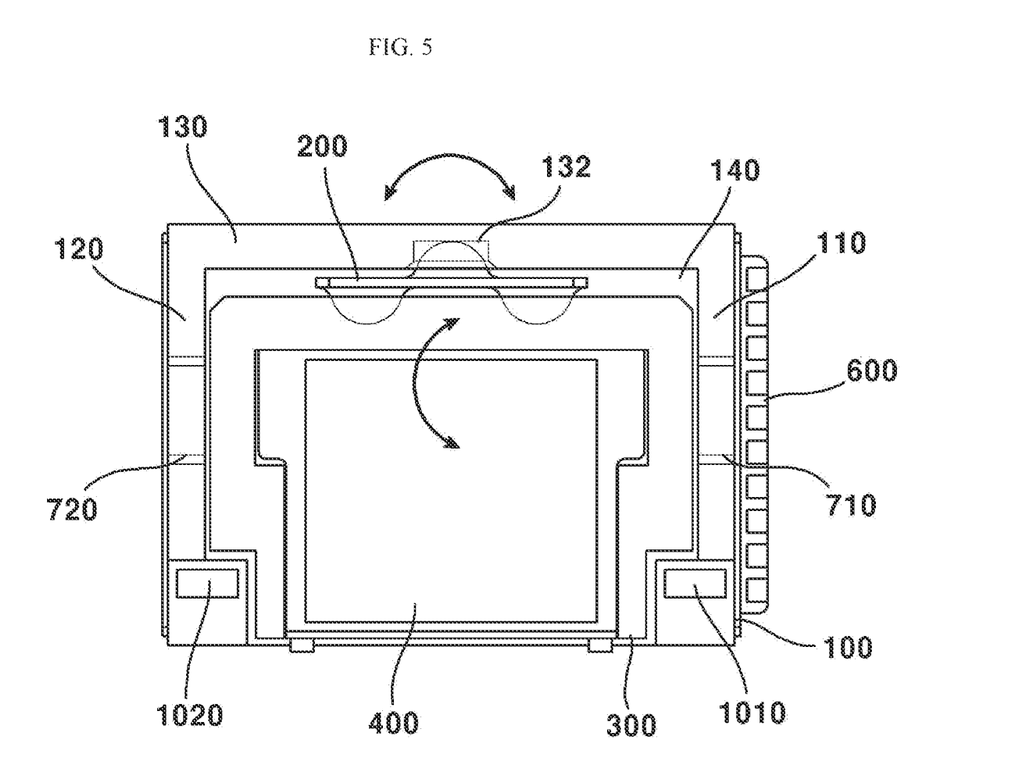
FIG. 5 is a plan view of a partial configuration of a prism driving device according to an embodiment of the present invention.
Figure 6:
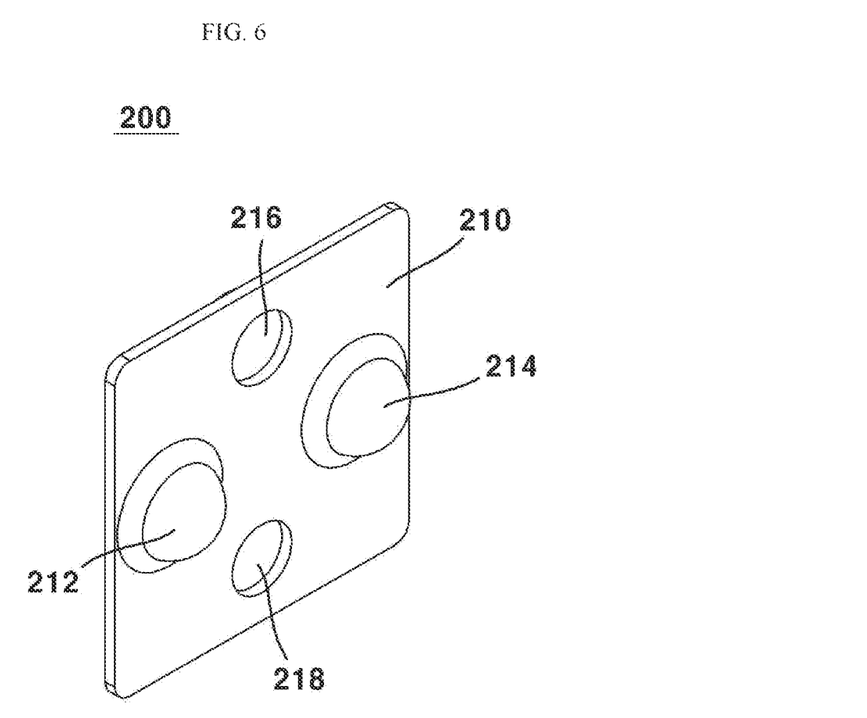
FIGS. 6 to 8 are views illustrating a guide part of a prism driving device according to an embodiment of the present invention.
Figure 7:
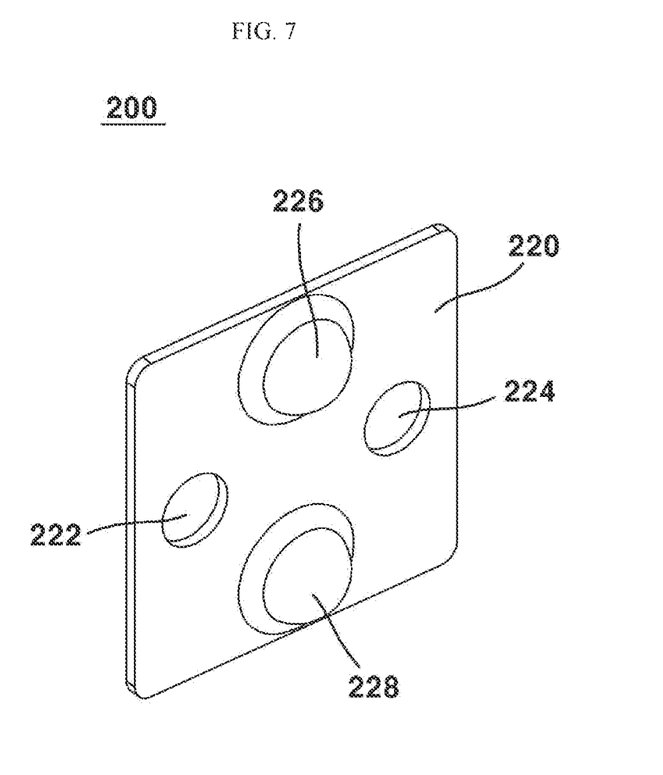
Figure 8:
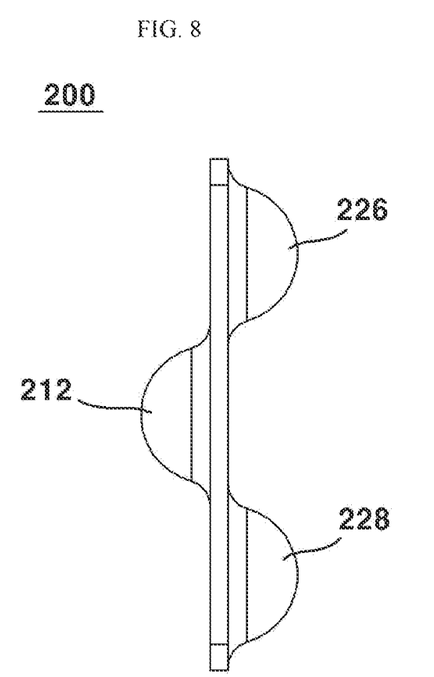
Figure 9:
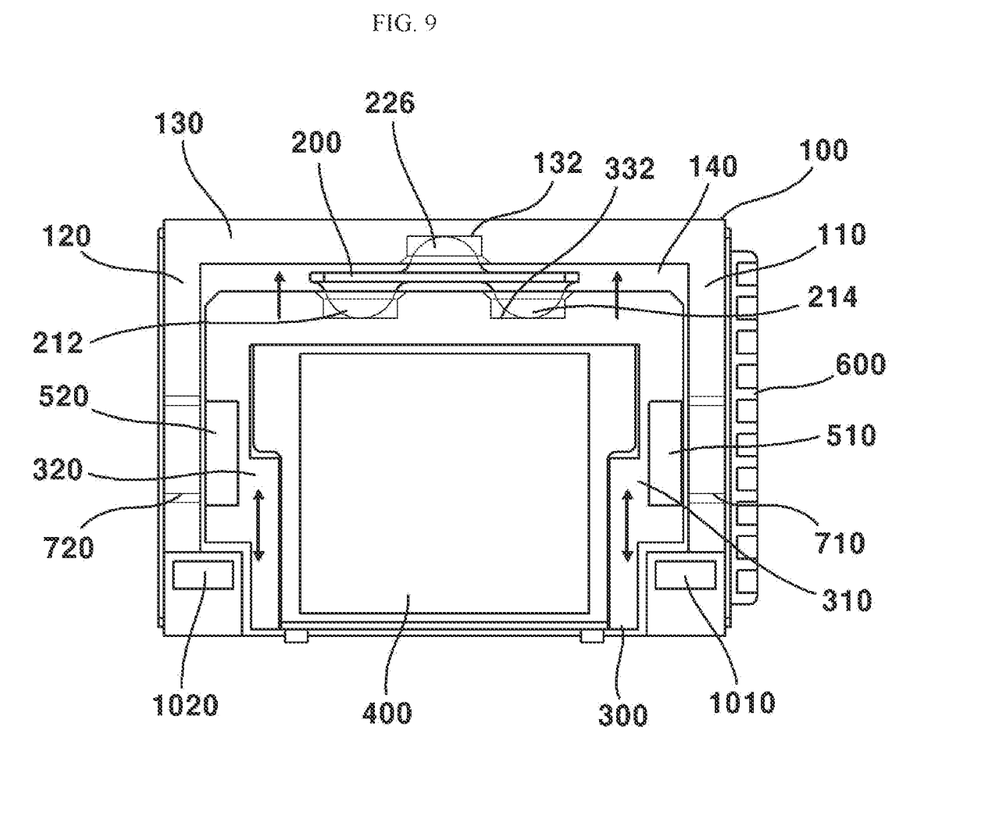
FIG. 9 is a plan view of a partial configuration of a prism driving device according to an embodiment of the present invention.
Figure 10:
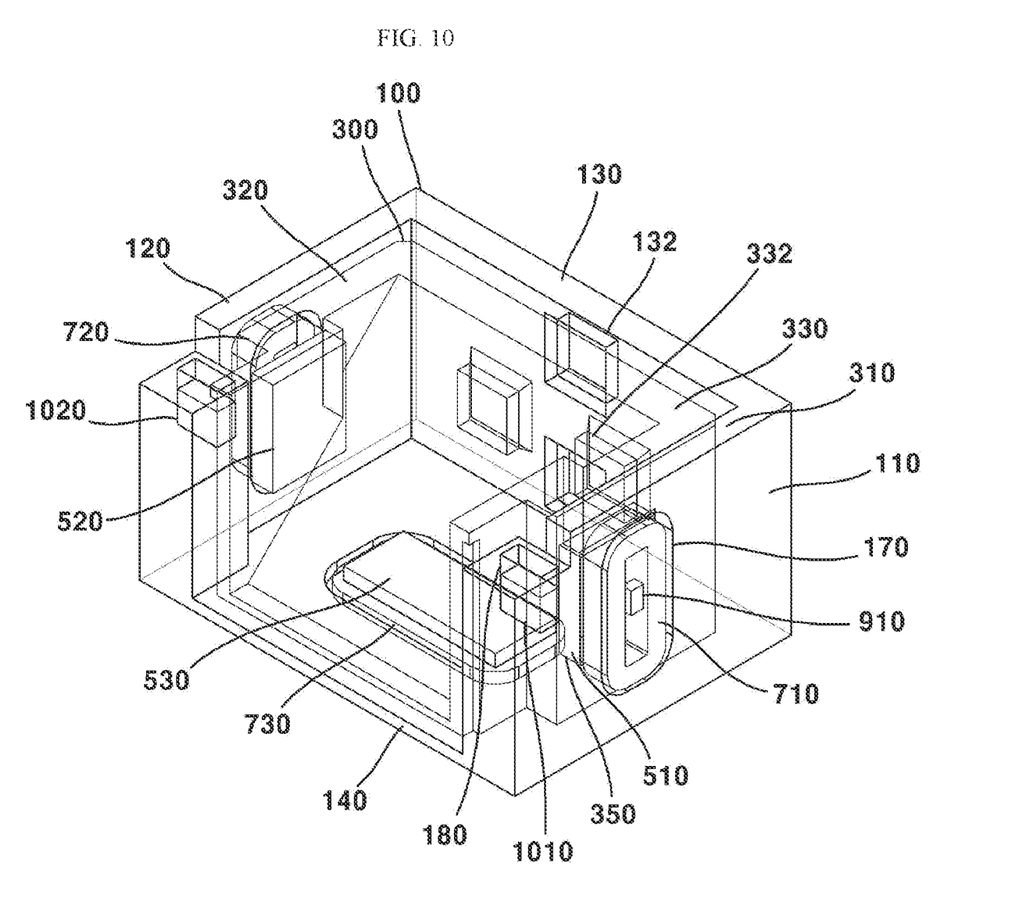
FIGS. 10 to 12 are perspective views of a partial configuration of a prism driving device according to an embodiment of the present invention.
Figure 11:
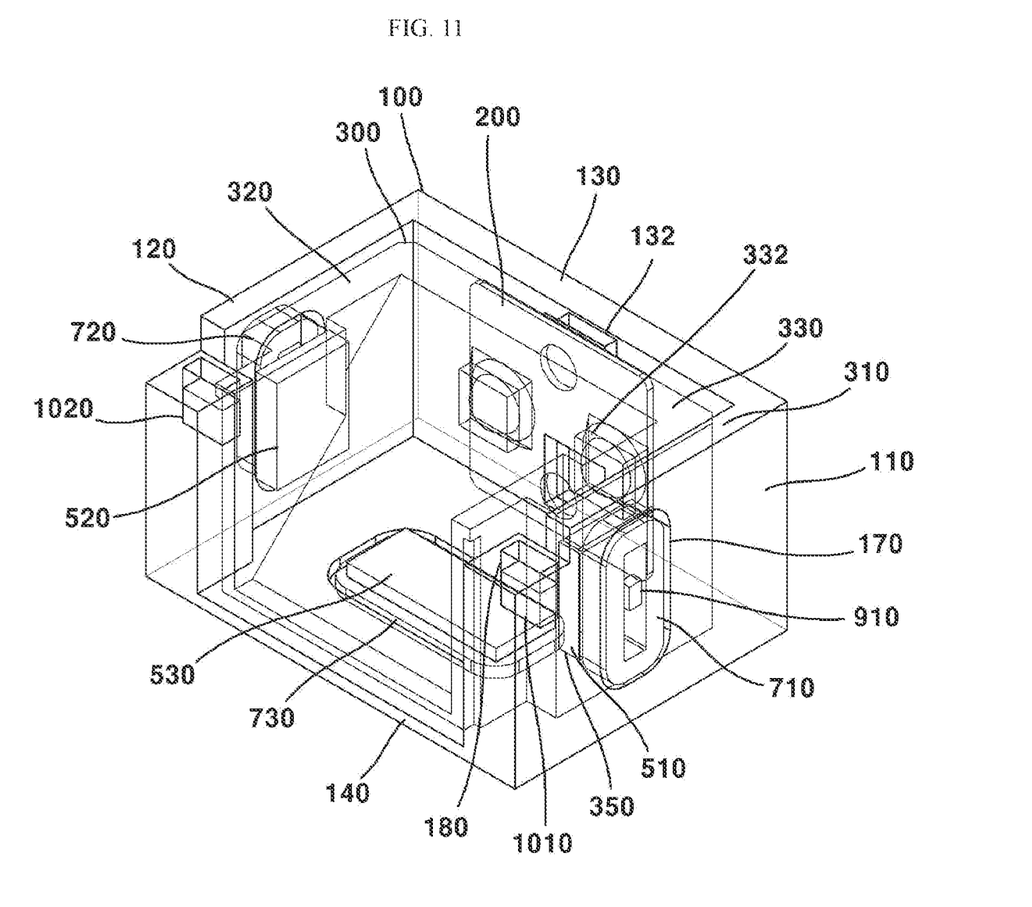
Figure 12:
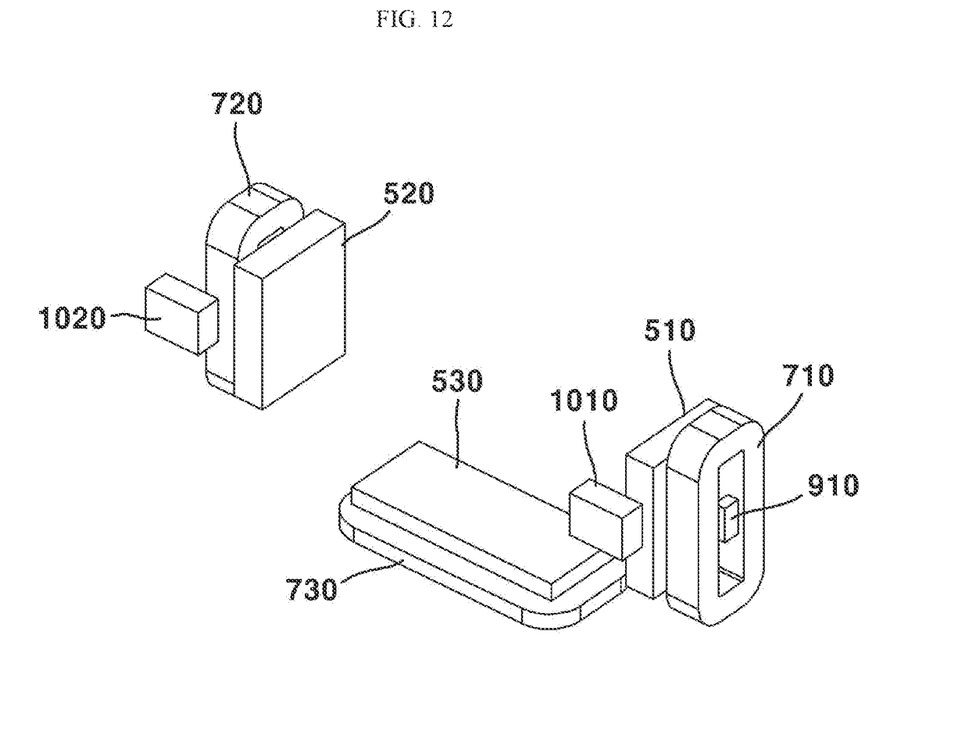

FIG. 1 is a perspective view of a prism driving device according to an embodiment of the present invention. FIG. 2 is an exploded perspective view of a prism driving device according to an embodiment of the present invention. FIG. 3 is a plan view of a prism driving device according to an embodiment of the present invention. FIG. 4 is a perspective view of a partial configuration of a prism driving device according to an embodiment of the present invention. FIG. 5 is a plan view of a partial configuration of a prism driving device according to an embodiment of the present invention. FIGS. 6 to 8 are views illustrating a guide part of a prism driving device according to an embodiment of the present invention. FIG. 9 is a plan view of a partial configuration of a prism driving device according to an embodiment of the present invention. FIGS. 10 to 12 are perspective views of a partial configuration of a prism driving device according to an embodiment of the present invention.

Referring to FIGS. 1 to 12, a prism driving device 10 according to an embodiment of the present invention may comprise a housing 100, a guide part 200, a mover 300, a prism 400, a first driving unit 500, a substrate 600, a second driving unit 700, a cover can 800, a sensor 900, and a second magnet 1000, but may be implemented except for some of these configurations, and additional configurations are not excluded.

The prism driving device 10 may comprise a housing 100. The housing 100 may form the outer appearance of the prism driving device 10. The housing 100 may be formed in a hexahedral shape with open upper and side surfaces. In the housing 100, a guide part, 200, a mover 300, a prism 400, a first driving unit 500, a substrate 600, a second driving unit 700, a sensor 900, and a second magnet 1000 may be disposed.

The housing 100 may comprise a lower surface 140, a first sidewall 110, a second sidewall 120 facing the first sidewall 110, and a third sidewall 130 connecting the first sidewall 110 and the second sidewall 120.

A substrate 600 may be disposed on a lower surface 140, the first sidewall 110, and the second sidewall 120 of the housing 100. The second driving unit 700 may be disposed on the lower surface 140, the first sidewall 110, and the second sidewall 120 of the housing 100. The lower surface 140 of the housing 100, the first sidewall 110, and the second sidewall 120 may comprise a groove 170 in which the second driving unit 700 is disposed.

The guide part 200 may be disposed between the third sidewall 130 of the housing 100 and the mover 300. The guide part 200 may be coupled to the third sidewall 130 of the housing 100. The second protruding portions 226 and 228 of the second surface 220 of the guide part 200 may be coupled to the third sidewall 130 of the housing 100. The third sidewall 130 of the housing 100 may comprise a second recess 132 in which the second protruding portions 226 and 228 of the guide part 200 are disposed. The second recess 132 may be formed to have a shape corresponding to that of the second protruding portions 226 and 228. The second recess 132 may comprise a plurality of second recesses in which the second protruding portions 226 and 228 and the fourth protruding unit 228 of the third protruding unit 226 are respectively disposed. The plurality of second recesses may be disposed to be spaced apart from one another in a vertical direction or a second direction.

The prism driving device 10 may comprise a guide part 200. The guide part 200 may be disposed between the housing 100 and the mover 300. The guide part 200 may be disposed between the surfaces facing each other of the mover 300 and the housing 100. Specifically, the first surface 210 of the guide part 200 may face the mover 300, and the second surface 220 may face the third sidewall 130 of the housing 100.

The guide part 200 may be formed in a plate shape. The guide part 200 may comprise first protruding portions 212 and 214 formed by being protruded from the first surface 210 toward the mover 300, and the second protruding portions 226 and 228 formed by being protruded from the second surface 220 toward the mover 300. Grooves 222 and 224 or recesses may be formed at positions where the first protruding portions 212 and 214 among the second surface 210 of the guide part 200 are being formed. Grooves 216 and 218 or recesses may be formed at positions where the second protruding portions 226 and 228 among the first surface 210 of the guide part 200 are being formed. Through this, the easiness of manufacturing the first and second protruding portions 212, 214, 226, and 228 may be improved. The first protruding portions 212 and 214 and the second protruding portions 226 and 228 may not be overlapped in a first axial direction. In an embodiment of the present invention, the first axial direction may mean a traveling direction of light reflected from the prism 400. In addition, in an embodiment of the present invention, the second axis direction may mean a direction perpendicular to the first axial direction and perpendicular to the propagation direction of light being incident on the prism 400.

The first protruding portions 212 and 214 may be formed to have a shape corresponding to the first recess 332 of the mover 300. The first protruding portions 212 and 214 may be seated in the first recess 332 of the mover 300. At least a portion of the first protruding portions 212 and 214 may be disposed in the first recess 332 of the mover 300. The first protruding portions 212 and 214 may comprise a first protruding unit 212 and a second protruding unit 214 being spaced apart in a horizontal direction. The first protruding unit 212 may be disposed on one side with respect to the center of the first surface 210, and the second protruding unit 214 may be disposed on the other side with respect to the center of the first surface 210.

The second protruding portions 226 and 228 may be formed to have a shape corresponding to the second recess 132 of the third sidewall 130 of the housing 100. The second protruding portions 226 and 228 may be seated in the second recess 132 of the third sidewall 130 of the housing 100. At least a portion of the second protruding portions 226 and 228 may be disposed in the second recess 132 of the third sidewall 130 of the housing 100. The second protruding portions 226 and 228 may comprise a third protruding unit 226 and a fourth protruding unit 228 that are vertically spaced apart from each other. The third protruding unit 226 may be disposed on one side with respect to the center of the second surface 220, and the fourth protruding unit 228 may be disposed on the other side with respect to the center of the second surface 220.

Through this, the guide part 200 may guide the tilting of the mover 300 in a second axis direction. The guide part 200 may be formed of a non-magnetic material. For example, the guide part 200 may be formed of a stainless (SUS) material. Through this, electromagnetic interference to the first driving unit 500 and the second driving unit 700 may be inhibited.

The prism driving device 10 may comprise a mover 300. The mover 300 may be disposed in the housing 100. The mover 300 may be disposed inside the housing 100. The mover 300 may be tiltably supported inside the housing 100 by the guide part 200. The mover 300 may comprise an accommodating portion in which the prism 400 is disposed. The mover 300 may be supported by the guide part 200 by the repulsive force of the first magnet 500 and the second magnet 1000. The mover 300 may be supported by the housing 100 by the repulsive force of the first magnet 500 and the second magnet 1000.

The mover 300 may comprise a lower surface, a first side surface 310, a second side surface 320 facing the first side surface 310, and a third side surface 330 connecting the first side surface 310 and the second side surface 320. The first side surface 310 of the mover 300 may face the first sidewall 110 of the housing 100. A first magnet unit 510 may be disposed on the first side surface 310 of the mover 300. The second side surface 320 of the mover 300 may face the second side wall 120 of the housing 200. A second magnet unit 520 may be disposed on the second side surface 320 of the mover 300. A third magnet unit 530 may be disposed on a lower surface of the mover 300. A normal line of the first side surface 310 may be parallel to a normal line of the second side surface 320. A normal line of the first side surface 310 or a normal line of the second side surface 320 may be orthogonal to a lower surface of the mover 300 or a normal line of the third side surface 330.

The mover 300 may comprise a first recess 332. The first recess 332 of the mover 300 may be formed on the third side surface 330 of the mover 300. The first recess 332 of the mover 300 may be formed at a position corresponding to the first protruding portions 212 and 214 of the guide part 200. The first protruding portions 212 and 214 of the guide part 200 may be disposed in the first recess 332 of the mover 330. At least a portion of the first protruding portions 212 and 214 of the guide part 200 may be disposed in the first recess 332 of the mover 330. The first recess 332 of the mover 330 may comprise: a first protruding unit 212 of the first protruding portions 212 and 214 of the guide part 200; and a plurality of first recesses 332 in which the second protruding units 214 are respectively disposed. The plurality of first recesses 332 may be spaced apart from each other in a horizontal direction, a first direction, or a second axis direction.

Through this, the mover 300 may be tiltably disposed inside the housing 100. In addition, the mover 300 is tilted with respect to the first axis and may be tilted with respect to the second axis through the above-described guide part 200. The mover 300 may be tilted with respect to the first axis by the first magnet 510 and the second magnet 520. The mover 300 may be tilted in a third direction perpendicular to the first direction by the third magnet 530.

The prism driving device 10 may comprise a prism 400. The prism 400 may be disposed inside the housing 100. The prism 400 may be disposed in the mover 300. The prism 400 may have an upper surface and a side surface exposed to the outside. The prism 400 may vertically change the movement path of the light by reflecting the light propagating from the upper portion. The prism 400 is coupled to the mover 300, and may be tilted with respect to the first axis according to the movement of the mover 300, and may be tilted with respect to the second axis.

The prism driving device 10 may comprise a first driving unit 500. The first driving unit 500 may be disposed in the mover 300. The first driving unit 500 may comprise a first magnet. The first driving unit 500 may face the second driving unit 700. The first driving unit 500 may tilt the mover 300 through electromagnetic interaction with the second driving unit 700.

The first driving unit 500 may comprise: a first magnet unit 510 disposed on a first side surface 310 of the mover 300; a second magnet unit 520 disposed on a second side surface 320 of the mover 300; and a third magnet unit 530 disposed on a lower surface of the mover 300. The first to third magnet units 510, 520, and 530 may face the first to third coils 710, 720, and 730, respectively. The first and second magnet units 510 and 520 may tilt the prism 400 and the mover 300 with respect to a first axis through electromagnetic interaction with the first and second coils 710 and 720. The third magnet unit 530 may tilt the prism 400 and the mover 300 with respect to a second axis through electromagnetic interaction with the third coil 730.

The first driving unit 500 may be a first magnet 500. The first magnet 500 may be overlapped or may not be overlapped with the guide part 200 in an optical axis direction. Specifically, the first magnet 500 may be overlapped or may not be overlapped with the central region of the guide part 200 in an optical axis direction. In the present invention, the optical axis direction may comprise: a first axis direction in which light is reflected from the prism 400; and a third axis direction in which light is incident to the prism 400. In this case, the first axis, the second axis, and the third axis may be orthogonal to each other.

The prism driving device 10 may comprise a yoke (not shown). The yoke may be disposed between the first driving unit 500 and the mover 300. The yoke may surround at least a portion of the first driving unit 500 except for the surface facing the second driving unit 700 to inhibit magnetic field leakage.

The prism driving device 10 may comprise a substrate 600. The substrate 600 may be disposed in the housing 100. The lower surface of the substrate 600 may be disposed on a lower surface 100 of the housing 100. The substrate 600 may be disposed on the first sidewall 110 and the second sidewall 120 of the housing 100. The second driving unit 700 may be disposed on the substrate 600. The substrate 600 may be electrically connected to the second driving unit 700. The substrate 600 may receive power from the outside and supply current to the second driving unit 700. The substrate 600 may be electrically connected to a sensor 900. The substrate 600 may supply current to the sensor 900.

At least a part of the substrate may be bent. The substrate 600 may comprise first to third surfaces. The first to third surfaces of the substrate 600 may be respectively disposed on the lower surface 140 of the housing 100 and the first and second sidewalls 110 and 120.

The substrate 600 may comprise a printed circuit board (PCB). The substrate 600 may comprise a flexible printed circuit board (FPCB).

The prism driving device 10 may comprise a second driving unit 700. The second driving unit 700 may be disposed in the housing 100. The second driving unit 700 may be disposed inside the housing 100. The second driving unit 700 may be disposed in the housing 100. The second driver 700 may be disposed on the substrate 600. The second driving unit 700 may be electrically connected to the substrate 600. The second driving unit 700 may comprise a coil. The second driving unit 700 may face the first driving unit 500. The second driving unit 700 may tilt the prism 400 and the mover 300 through electromagnetic interaction with the first driving unit 500.

The second driving unit 700 may comprise: a first coil 710 being disposed on a first surface of the substrate 600 or the first sidewall 110 of the housing 100; a second coil 720 being disposed on a second surface of the substrate 600 or the second sidewall 120 of the housing 100; and a third coil 730 being disposed on a third surface (lower surface) of the substrate or a lower surface 140 of the housing 100. The first coil 710 is disposed at a position corresponding to the first magnet unit 510; the second coil 720 is disposed at a position corresponding to the second magnet unit 520; and the third coil 730 may be disposed at a position corresponding to the third magnet unit 530. The first and second coils 710 and 720 may tilt the prism 400 and the mover 300 with respect to the first axis through electromagnetic interaction with the first and second magnet units 510 and 520. The third coil 730 may tilt the prism 400 and the mover 300 with respect to the second axis through electromagnetic interaction with the third magnet unit 530.

The prism driving device 10 may comprise a cover can 800. The shield can 800 may surround the housing 100. The shield can 800 may be formed of a metal material. The shield can 800 may inhibit the electromagnetic field generated inside the prism driving device 10 from being emitted to the outside. The shield can 800 may inhibit electromagnetic interference in the prism driving device 10 that may be generated from the outside.

The prism driving device 10 may comprise a sensor 900. The sensor 900 may be disposed in the second driving unit 700. The sensor 900 may face the first driving unit 500. The sensor 900 may be electrically connected to the substrate 600. The sensor 900 may comprise a Hall sensor. The sensor 900 may detect the movement of the first driving unit 500. Through this, feedback control is possible. The sensor 900 may comprise first to third sensor units disposed inside the first to third coils 710, 720, and 730, respectively.

The prism driving device 10 may comprise a second magnet 1000. The second magnet 1000 may be disposed in the housing 100. The second magnet 1000 may be disposed in the groove 180 formed on an upper surface of the housing 100. The second magnet 1000 may face the first driving unit 500. At this time, the first driving unit 500 may comprise a first magnet. That is, the mover 300 may be supported by the housing 100 by using the repulsive force between the second magnet 1000 and the first driving unit 500. The second magnet 1000 and the first magnet 500 may face each other with the same pole. For example, surfaces of the second magnet 1000 and the first magnet 500 facing each other may be magnetized to have the same pole.

The second magnet 1000 may comprise: a fourth magnet unit 1010 disposed at a position corresponding to the first magnet unit 510; and a fifth magnet unit 1020 disposed at a position corresponding to the second magnet unit 520. The length of the fourth and fifth magnet units 1010 and 1020 in a first direction may be longer than the length of the first and second magnet units 510 and 520 in a first direction. The lengths of the fourth and fifth magnet units 1010 and 1020 in a second direction perpendicular to the first direction may be formed to be shorter than the lengths of the first and second magnet units 510 and 520 in a second direction. The fourth and fifth magnet units 1010 and 1020 may be disposed higher than the central area of the first and second magnet units 510 and 520, respectively. The fourth and fifth magnet units 1010 and 1020 may be disposed above the central region of the first and second magnet units 510 and 520 in a second direction, respectively. Through this, the mover 300 can be stably attached to the housing 100.

The fourth magnet unit 1010 may be disposed on one side of the first magnet unit 510, and the guide part 200 may be disposed on the other side of the first magnet unit 510. The fifth magnet unit 1020 may be disposed on one side of the second magnet unit 520, and the guide part 200 may be disposed on the other side of the second magnet unit 520.

According to one embodiment of the present invention, through the simple structure of the guide part 200, the tilting of the prism 300 with respect to the first axis and the tilting of the prism 300 with respect to the second axis become possible, thereby reducing the size of the product. Here, the tilting angle of the prism 300 with respect to the first axis may be within 1.5 degrees, and the tilting angle of the prism 300 with respect to the second axis may be within 1.5 degrees.

In addition, according to an embodiment of the present invention, since the mover 300 can be supported in the housing 100 by the repulsive force between the second magnet 1000 and the first driving unit 500, the size of the product can be reduced.

In an embodiment of the present invention, the prism driving device 10 may be a camera driving device for tilting the lens of the camera, not the prism 400. Specifically, the prism driving device 10 may be a handshake correction device, or a driving device for optical image stabilization (OIS).

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A prism driving device comprising:
a housing;
a mover disposed on the housing;
a prism disposed on the mover;
a first magnet disposed on the mover;
a coil disposed on the housing;
a guide part disposed between the housing and the mover to guide a tilting of the mover; and
a second magnet disposed on the housing and facing the first magnet,
wherein the first magnet and the second magnet face each other with a same pole, and
wherein the mover is supported by the guide part by a repulsive force between the first magnet and the second magnet.

2. The prism driving device of claim 1, wherein a central region of the guide part and the first magnet are not overlapped in an optical axis direction.

3. The prism driving device of claim 1, wherein the first magnet comprises first to third magnet units, and
wherein the coil comprises first to third coils.

4. The prism driving device of claim 3, wherein the first magnet unit is disposed on a first side surface of the mover,
wherein the second magnet unit is disposed on a second side surface opposite to the first side surface of the mover, and
wherein the third magnet unit is disposed on a lower surface of the mover.

5. The prism driving device of claim 4, wherein the first coil is disposed at a position corresponding to the first magnet unit,
wherein the second coil is disposed at a position corresponding to the second magnet unit, and
wherein the third coil is disposed at a position corresponding to the third magnet unit.

6. The prism driving device of claim 5, wherein the first and second magnet units allow the mover to be tilted about a first axis, and
wherein the third magnet unit allows the mover to be tilted about a second axis perpendicular to the first axis.

7. The prism driving device of claim 4, wherein a normal line of the first side surface is parallel to a normal line of the second side surface, and
wherein the normal line of the first side surface or the second side surface is orthogonal to a normal line of the lower surface.

8. The prism driving device of claim 4, wherein the second magnet comprises a fourth magnet unit disposed at a position corresponding to the first magnet unit, and a fifth magnet unit disposed at a position corresponding to the second magnet unit.

9. The prism driving device of claim 8, wherein a length of the fourth magnet unit in a first direction is greater than a length of the first magnet unit in the first direction, and
wherein a length of the fourth magnet unit in a second direction perpendicular to the first direction is shorter than a length of the first magnet unit in the second direction.

10. The prism driving device of claim 8, wherein the fourth magnet unit is disposed higher than a central region of the first magnet unit.

11. The prism driving device of claim 1, wherein the housing comprises a first groove formed on an upper surface of the housing, and
wherein the second magnet is disposed on the first groove.

12. The prism driving device of claim 1, wherein the second magnet is disposed at one side of the first magnet, and
wherein the guide part is disposed at an other side of the first magnet.

13. The prism driving device of claim 1, wherein the guide part is disposed between surfaces facing each other of the mover and the housing.

14. The prism driving device of claim 13, wherein the guide part comprises a first protruding portion disposed on a first surface facing the mover and a second protruding portion disposed on a second surface facing the housing.

15. The prism driving device of claim 14, wherein the first protruding portion comprises a first protruding unit disposed at one side with respect to a center of the first surface, and a second protruding unit disposed at an other side with respect to the center of the first surface, and
wherein the second protruding portion comprises a third protruding unit disposed at one side with respect to a center of the second surface and a fourth protruding unit disposed at an other side with respect to the center of the second surface.

16. The prism driving device of claim 14, wherein the mover comprises a first recess formed on an outer side surface of the mover facing the first surface of the guide part,
wherein the first protruding portion is disposed on the first recess of the mover,
wherein the housing comprises a second recess formed on an inner side surface of the housing facing the second surface of the guide part, and
wherein the second protruding portion is disposed on the second recess of the housing.

17. The prism driving device of claim 1, comprising:
a substrate disposed on the housing; and
a yoke disposed between the mover and the first magnet,
wherein the coil is electrically connected to the substrate.

18. A prism driving device comprising:
a housing;
a mover disposed on the housing;
a prism disposed on the mover;
a first magnet disposed on the mover;
a coil disposed on the housing;
a guide part disposed between the housing and the mover to guide a tilting of the mover; and
a second magnet disposed on the housing and facing the first magnet,
wherein the mover and the guide part are supported by the housing by a repulsive force between the first magnet and the second magnet.

* * * * *